INVENTORS
MARTIN V. ZIDRON
BEN W. RAU
ROBERT I. NAGEL
BY Dominik & Stein
ATTYS.

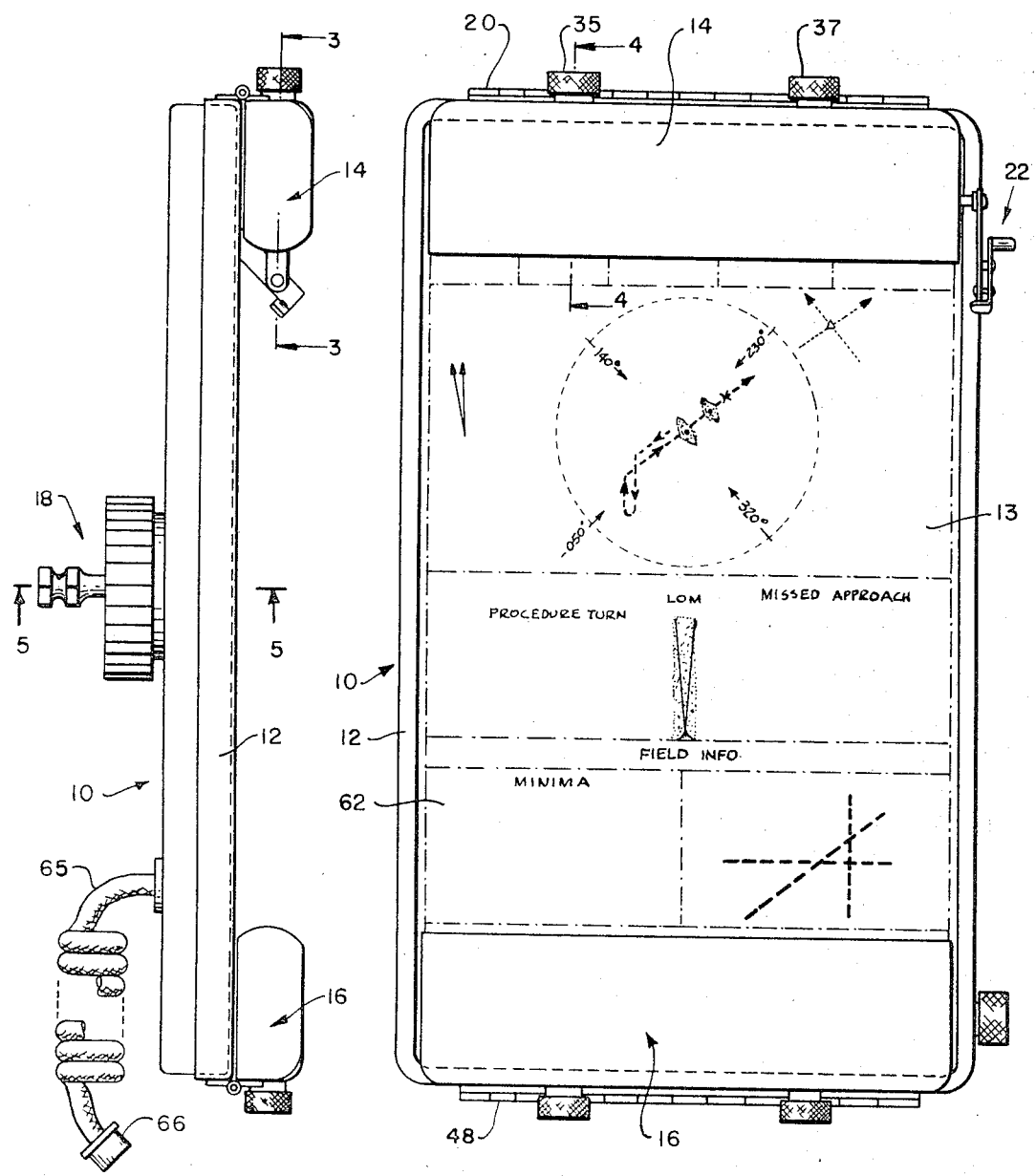

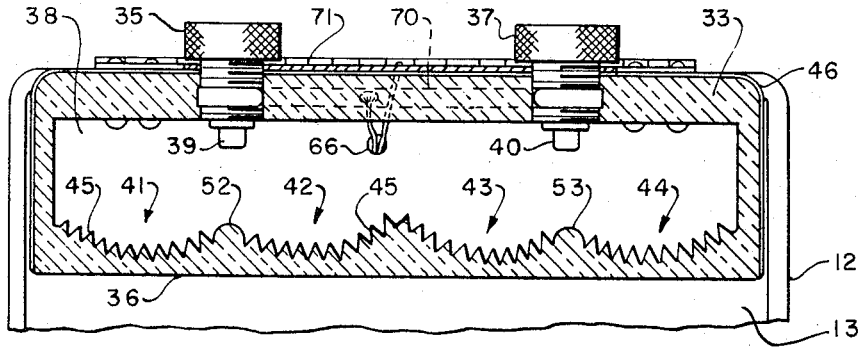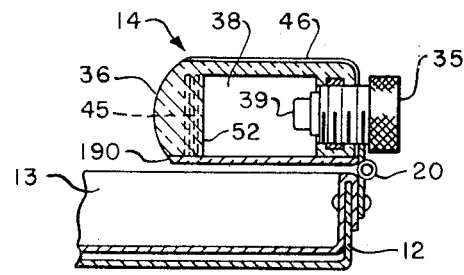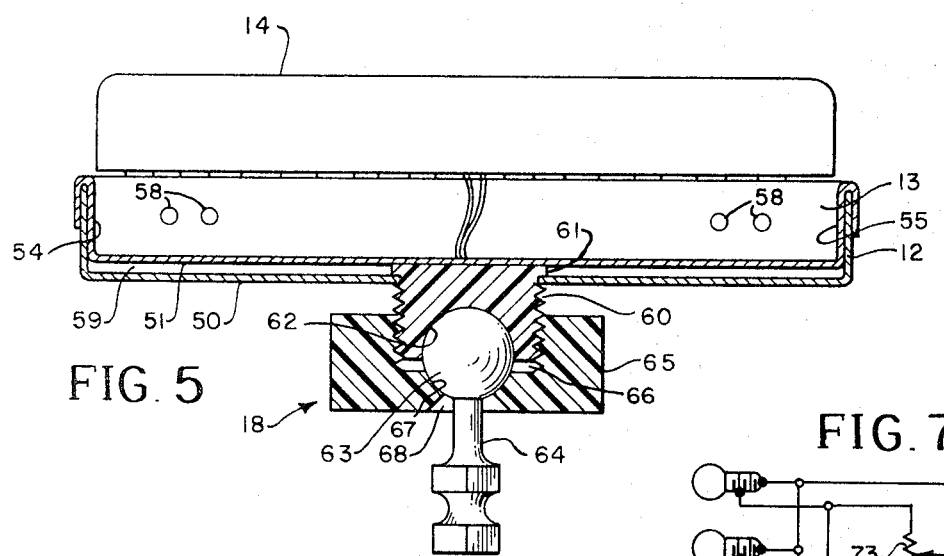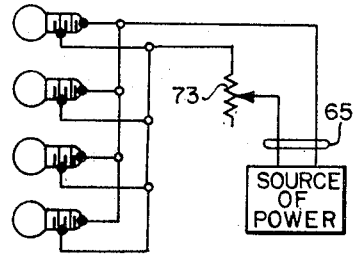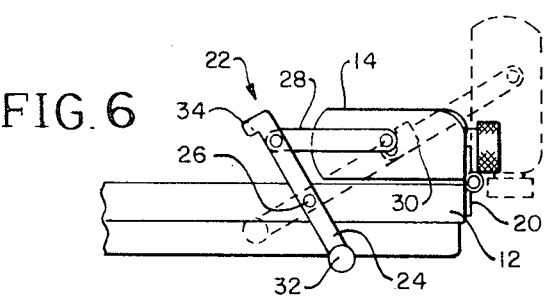

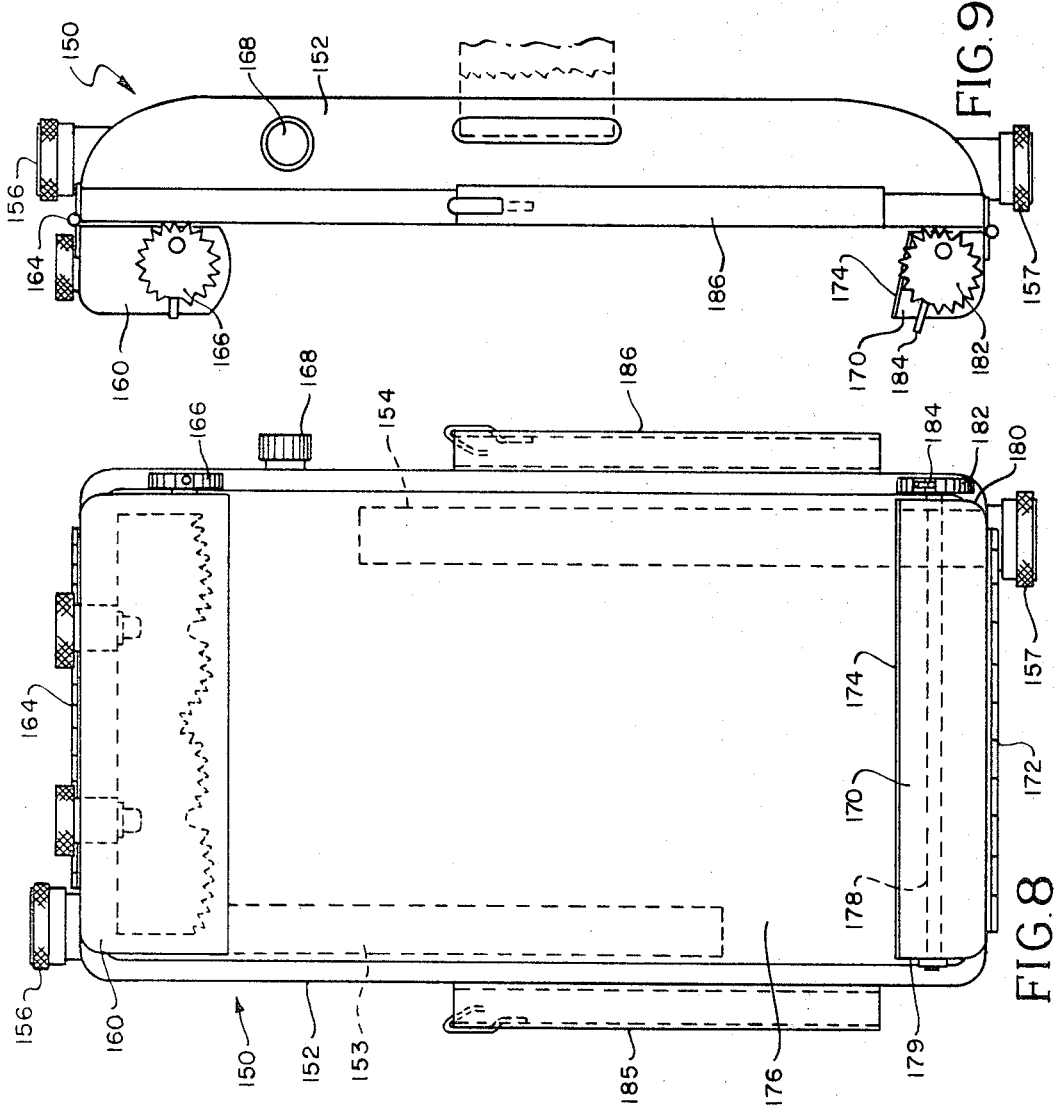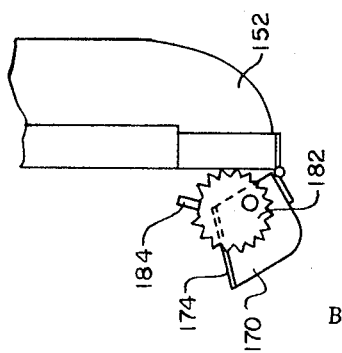

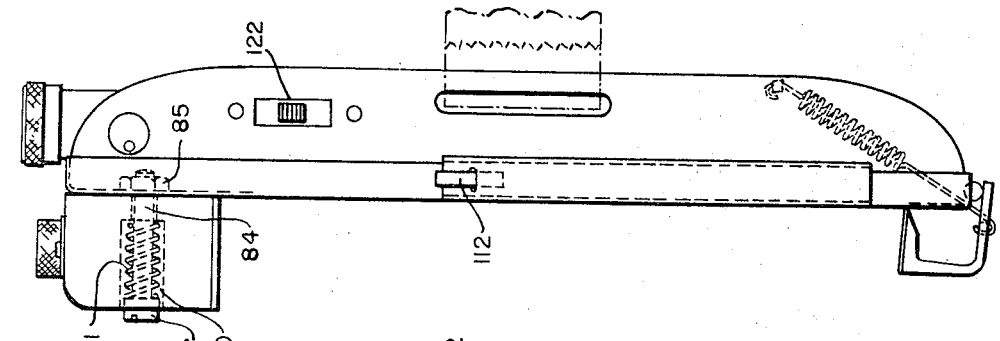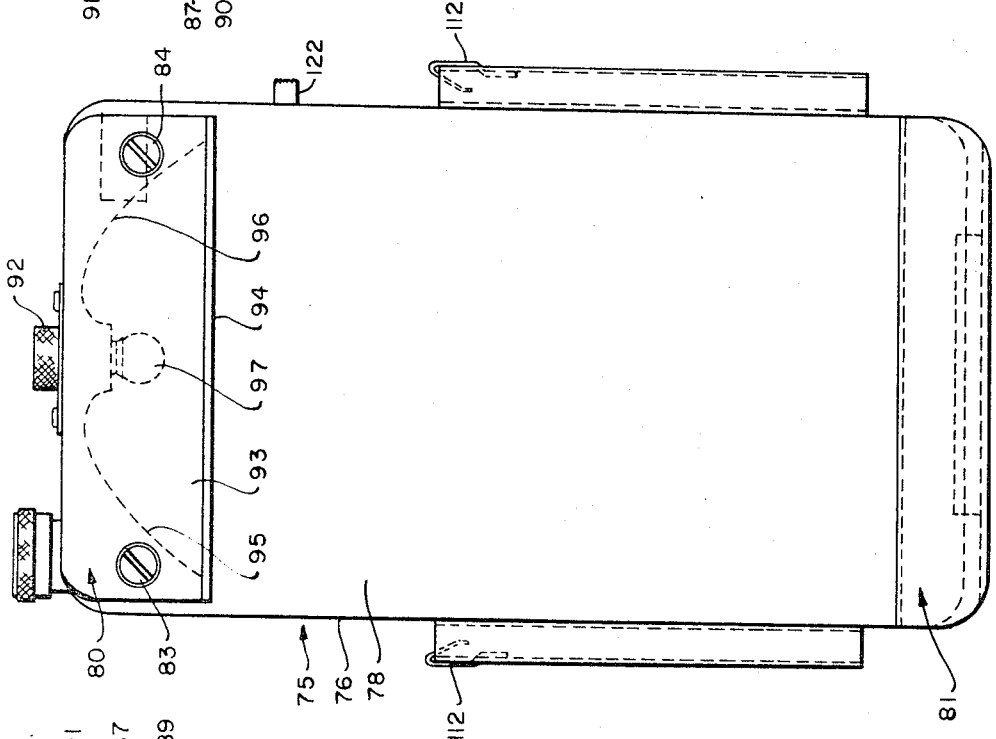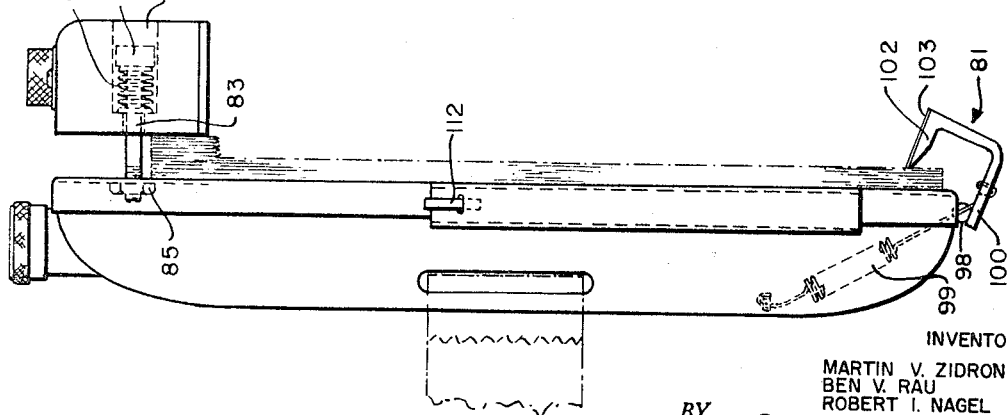

United States Patent Office 3,452,188
Patented June 24, 1969

3,452,188
PILOT CHARTBOARD AND EMERGENCY
COCKPIT PANEL LIGHTING
Martin V. Zidron, 1404 Harding St., Berkeley, Ill., Ben
W. Rau, 1535 Knollwood, Highland Park, Ill. 60035,
and Robert I. Nagel, Berkeley, Ill. (3729 Roth Terrace,
Skokie, Ill. 60076)
Filed Feb. 18, 1966, Ser. No. 528,601
Int. Cl. F21v 33/00
U.S. Cl. 240—2
14 Claims

ABSTRACT OF THE DISCLOSURE

A clipboard which includes a body portion for receiving and retaining flat indicia such as approach charts and the like and a pair of illuminating heads which are affixed to the opposite ends of the body portion and which are adapted to both clamp the flat indicia onto the body portion and to illuminate it.

---

This invention relates to clipboards and more particularly to clipboards which can be illuminated and which are particularly adapted both for use by individuals who have only one free hand for recording data, such as an airplane pilot, and for use as emergency cockpit panel lighting.

In the past, numerous clipboards have been devised however, none of them have been entirely satisfactory for one reason or another, particularly for use by airplane pilots. In many cases, the clipboard did not have sufficient illumination to be used at night, or the contrary is true. There is too much illumination, and the airplane pilot would be temporarily blinded after using the clipboard until his vision again adapted to the darkness. Many of the available clipboards also are difficult to manipulate with one hand, and others do not provide sufficient space for handling any quantity of material or for writing.

In night flying, airplane pilots are generally dependent upon the various instruments within the airplane, and the instruments are accordingly lighted so that they can be easily seen and read. Inasmuch as the instruments are relied upon, emergency lighting is generally provided in the event the instrument lights fail. The emergency lighting is generally in the form of a flashlight. It would therefore be particularly advantageous to have a clipboard which can also function as emergency lighting for the cockpit panel.

Accordingly, it is an object of the present invention to provide improved clipboards.

More particularly, it is an object to provide improved illuminated clipboards. In this respect, it is further contemplated that the illuminating means serve a dual function of clamping flat indicia to the clipboard and providing illumination therefor, and still further that the illuminating means be adapted for one-handed operation.

Another object is to provide improved illuminated clipboards which can function as emergency cockpit panel lighting.

Still another object is to provide improved clipboards which are particularly adapted for use by, for example, airplane pilots, in darkness.

Another object is to provide improved clipboards which can be easily and relatively inexpensively manufactured.

A still further object is to provide improved illuminating means for clipboards.

Still another object is to provide improved clipboards which are particularly adapted for use by military personnel.

A still further object is to provide clipboards having improved means for holding papers and the like, which means are easily manipulated with one hand.

The above outlined objectives are accomplished with a clipboard which according to a preferred embodiment of the invention generally includes a body portion which has a recessed pocket formed in it for receiving and retaining flat indicia such as approach charts and the like. A pair of illuminating heads are affixed to the opposite ends of the body portion and are adapted to both clamp the flat indicia within the recessed pocket and to illuminate it. Both of the illuminating heads are adapted to provide lighting which is variable in intensity, and the illuminating heads each have a lens adapted to provide greater illumination on the flat indicia. One or both of the illuminating heads has a lever assemblage affixed to it which is operable with one hand to pivot the illuminating head to enable positioning and clamping of the flat indicia within the recessed pocket.

A modification of the above generally described embodiment is to replace one of the lighted illuminating heads with an illuminating head which only has a reflective surface that is adapted to reflect light onto the flat indicia. Another lever assemblage including an eccentric wheel is affixed to the modified illuminating head for pivoting it.

The illuminating heads are further constructed so that they can be opened and directed towards the cockpit panel to provide emergency cockpit panel lighting.

In still another embodiment of the invention, the body portion has a flat writing surface, rather than a recessed pocket, and is battery operated.

With this latter embodiment, several variations in the construction of illuminating heads is illustrated, including the manner of affixing them to the body portion. In each case, the illuminating heads are adapted to provide both of the functions outlined above, of clamping and illuminating the flat indicia secured to the clipboard.

It will be apparent from the detailed description below, that a clipboard having one or the other of the disclosed body portions with several combinations of the disclosed illuminating heads can be provided, which clipboard is easily operated with one hand to both clamp and illuminate flat indicia secured thereto.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG 1 is a top plan view of a clipboard exemplary of a preferred embodiment of the invention;

FIG. 2 is a side plan view of the clipboard of FIG. 1;

FIG. 3 is a sectional view of an illuminating head, taken substantially along lines 3—3 of FIG. 2;

FIG. 4 is a sectional view of an illuminating head, taken substantially along lines 4—4 of FIG. 2;

FIG. 5 is a sectional view of the clipboard, taken along lines 5—5 of FIG. 2;

FIG. 6 is a reduced, partial view of the pivot assemblage;

FIG. 7 is a schematic of the electrical circuitry for the clipboard;

FIG. 8 is a top plan view of a clipboard exemplary of another embodiment of the invention;

FIG. 9 is a side plan view of the clipboard of FIG. 8;

FIG. 10 is a partial side view of the clipboard of FIG. 8, illustrating the operation of the eccentric cam wheel in raising the illuminating head;

FIG. 11 is a top plan view of a clipboard exemplary of still another embodiment of the invention;

FIG. 12 is a side plan view of the clipboard of FIG. 11;

FIG. 13 is a side plan view of the clipboard of FIG. 11 illustrating the manner in which papers and the like are secured thereto;

Figure 14:
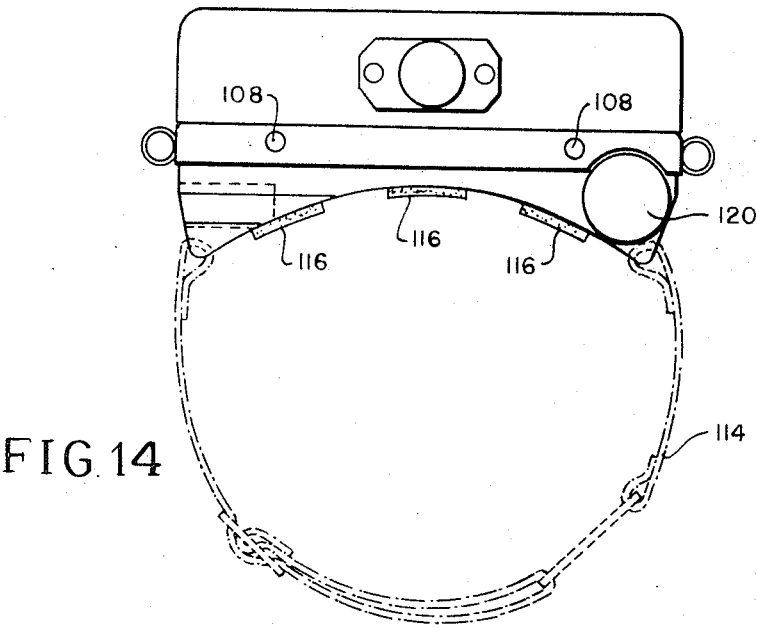
FIG. 14 is an end plan view of the clipboard of FIG. 11.
Figure 20:
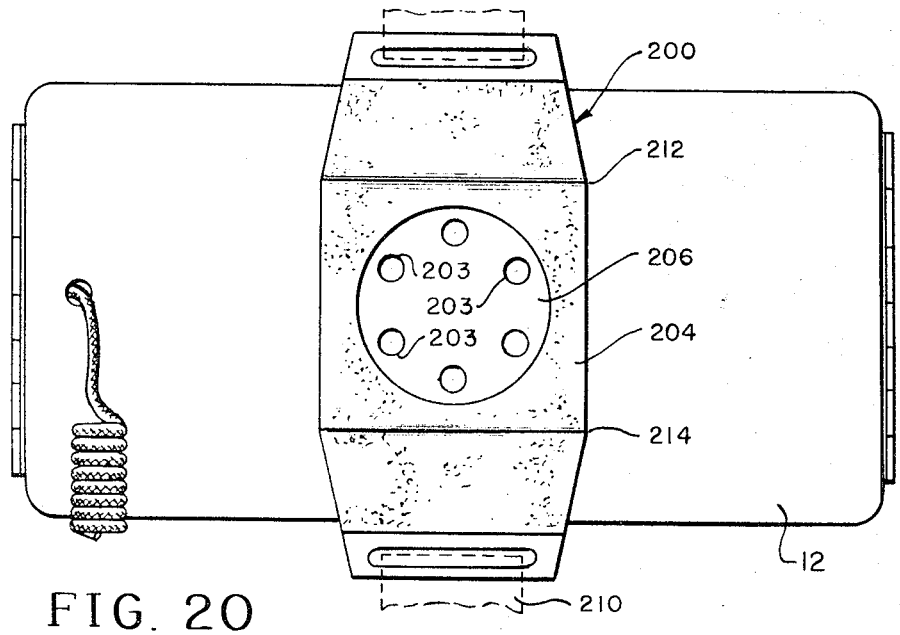
FIGS. 20 and 21 are a bottom and sectional view, respectively, of a clipboard illustrating a leg strap assembly.
Figure 21:
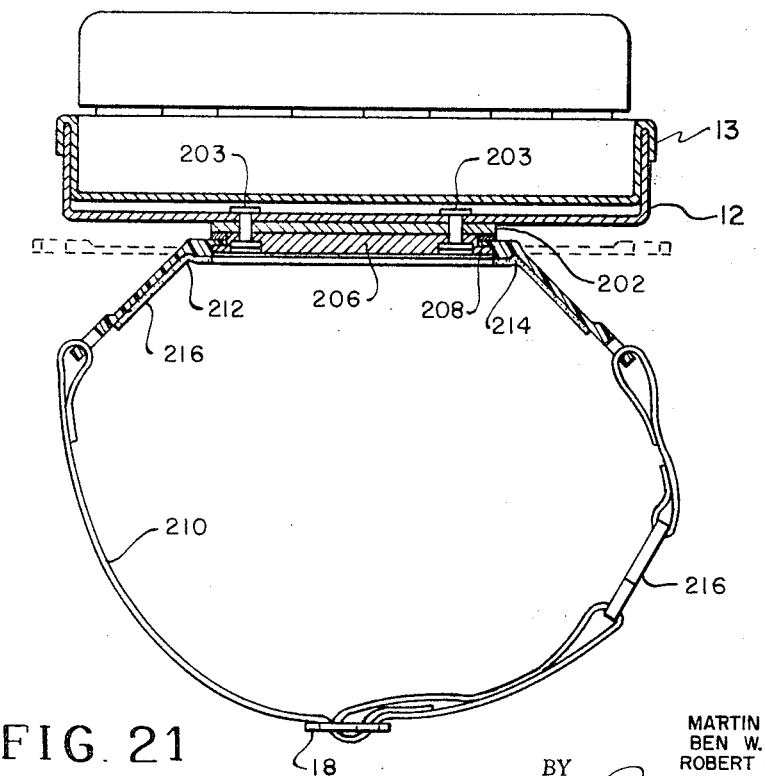

Referring now to the drawings, in FIGS. 1–7 there is illustrated a clipboard 10 which has a construction exemplary of a preferred embodiment of the invention. The clipboard 10 generally includes a main body portion 12 which provides a recessed pocket 13 (FIG. 5) and a pair of illuminating heads 14 and 16 positioned at the extreme ends of the body portion 12 so as to reflect light upon the pocket 13. A fastener, such as the ball mount assembly 18 illustrated in FIG. 2 or a leg strap assembly as illustrated in FIG. 14, or 20 and 21, can be affixed to the underside of the body portion 12. The illuminating heads 14 and 16 also function to secure flat indicia such as papers and the like to the clipboard 10.

The illuminating head 14 is hinged to the body portion 12 preferably by means of a spring loaded hinge 20 which extends across its width; however, one or more hinges can be used. The illuminating head 14 is further adapted to be pivoted, with one hand, by means of a lever assemblage 22 which may be best seen in FIGS. 1 and 6. The lever assemblage 22 includes a lever arm 24 which is pivotally secured to the side of the body portion 12 by a pivot pin 26, and a lever arm 28 which is pivotally affixed at its one end to the lever arm 24 and at its other end to a side wall 30 of the illuminating head 14. The lever arm 24 also has an off-set handle 32 secured to its one end for assisting one hand operation of the illuminating head 14 and its opposite end has a stop 34 which engages the lever arm 28 to limit the movement of the illuminating head 14. The illuminating head 14 can be pivoted to an open position and will remain open due to an over centering lock movement of the lever arm 24, as the stop 34 engages the lever arm 28. Upon closing, by moving the lever arm 24 to the right (as shown), the spring loaded hinge 20 forcibly urges the illuminating head 14 to a closed position. The illuminating head 14, through the action of the spring loaded hinge 20, therefore also functions as a spring loaded clip to retain papers such as charts and the like, within the pocket 13.

The illuminating head 14 is substantially rectangular in shape and has a front wall which has a convex outer surface along its vertical axis and a cylindrical outer surface along its horizontal axis, thereby forming a lens 36 for directing light onto the material within the pocket 13. The interior of the illuminating head 14 is hollowed and forms a reflecting cavity 38 which is adapted to direct light toward the lens 36. The underside of the illuminating head 14 is preferably open but it can be sealed with a transparent or light transmitting plate 190 if desired. A pair of light bulbs 39 and 40 are retained with sockets 35 and 37, respectively, which are removably mounted in spaced relation in the back wall 33 so as to extend the light bulbs into the reflecting cavity 38. The rear surface of the front wall or lens 36 within the reflecting cavity 38 opposite respective ones of the light bulbs 39 and 40 is formed with a pair of refractive surfaces 41 and 42, and 43 and 44, each of which is parabolic in curvature and extends about the same horizontal axis but in oppositely disposed directions and has vertically aligned V-shaped grooves 45 formed therein. A barrel lens 52 and 53 is positioned directly opposite respective ones of the light bulbs 39 and 40 between the pairs of refractive surfaces 41, 42 and 43, 44. The exterior of the illuminating head 14, with the exception of the front wall or lens 36, is opaqued, as with a painted material 46, so that the light is only radiated through the lens 36 onto the material within the pocket 13.

The illuminating head 16 secured to the opposite end of the body portion 12 is constructed in identically the same fashion as the illuminating head 14, and it is pivotally affixed to the body portion 12 by means of a spring loaded hinge 48. A lever assemblage like the lever assemblage 22 also may be affixed to this illuminating head to pivot it. Satisfactory operation, however, is generally provided without it.

The main body portion 12 of the clipboard is formed of two rectangular shaped shells 50 and 51. The shell 51 fits within the shell 50 and is spaced from it to form a false bottom. The two shells are secured to one another by folding the edges of the shell 51 over the side walls of the shell 50. A number of threaded screws 58 secure the hinges 20 and 48 to the main body portion 12, and also function to secure the shells 50 and 51 to one another. With this construction, the clipboard can be easily disassembled to repair the electrical wiring and the other components, discussed more fully below, concealed within the false bottom.

The ball mount assembly 18 includes a threaded socket 60 having an enlarged annular lip or rim 61. To affix the ball mount assembly 18 to the clipboard 10, the socket 60 is threaded through an aperture (not shown) in the shell 50, and the lip 61 is adapted to engage the shell 50 to prevent the socket from being threaded through it. Alternatively, the socket 60 can be secured to the shell 50 by threaded screws extended through the socket and into the shell.

The socket 60 also has a ball receiving cavity 62 formed in it for receiving a portion of a ball 63 which is threaded onto the end of a mounting shaft 64. A nut 65 has a threaded cavity 66 in it for receiving the end of the socket 60 and a cavity 67 for also receiving a portion of the ball 63. The mounting shaft 64 extends through a beveled aperture 68 in the nut 65, and is adapted to be affixed to an appropriately fitted fastener or support within a vehicle, such as an aircraft. The clipboard 10 can be angularly positioned, as desired, by tightening the nut 65 to forcibly grip the ball 63 between the socket 60 and the nut 65, in the well known manner.

The recessed pocket 13 provides a storage for material, such as a supply of paper, and is specially formed to retain approach plates, let-down charts, enroute charts and the like generally used by aircraft pilots, and particularly military pilots. The clipboard, accordingly, is designed to meet all of the military specifications for such items.

When used, one finger is placed on the offset handle 32 and the thumb is placed on the end of the lever arm 28. By exerting a small force on the handle and the lever arm, the illuminating head 14 can be pivoted to an open position, and can be locked in this position by engaging the stop 34 with the lever arm 28. Material such as paper, charts and the like can be placed in the recessed pocket 13, and the lever assemblage 22 operated to return the illuminating head 14 to its normal position. The illuminating head 16 is next pivoted by gripping it with the fingers, and simultaneously the material is dropped into the recessed pocket 13. The illuminating head 16 is then closed to its normal position. In FIGS. 1 and 2, an approach plate 62 is illustrated and it can be seen that it is retained within the recessed pocket 13 by the illuminating heads 14 and 16. From the description of the operation of the clipboard, it is apparent that the material can be easily and simply placed and secured with the pocket 13, with only one hand.

The false bottom provides a channel 59 for concealing and enclosing the electrical connections for energizing the light bulbs, such as the light bulbs 39 and 40, within the illuminating heads 14 and 16. In FIG. 2 it can be seen that a coiled electrical cord 65 having an adaptor 66 affixed to its one end for connecting to a source of power is secured to the underside of the clipboard 10. In FIG. 7, the source of power is illustrated in block diagram. The cord 65 includes a pair of conductors which run through the channel 59 and through apertures, such as the aperture 66 (FIG. 3) into the illuminating heads 14 and 16. The light bulbs, in each of the illuminating heads, as can be seen in FIGS. 3 and 7, are connected in parallel by means of conductor bars 70 which extend along the underside of respective ones of the illuminating heads and are partially wrapped about the sockets for the light bulbs, and conductor bars 71 which are secured to the rear of respective ones of the illuminating heads and are adapted to contact the light bulbs. A control switch such as a rheostat 73 is included in the electrical connections between the source of power and the light bulbs to turn the light bulbs ON and OFF and to provide a continuously variable intensity of light. In this manner, the light bulbs can be energized and adjusted to provide the desired intensity. Illumination is provided at each end of the clipboard so that the material within the pocket 13 is clearly and substantially evenly illuminated.

In FIGS. 8-10, there is illustrated a clipboard 150 exemplary of another embodiment of the invention. The clipboard 150 has a body portion 152 which is of substantially the same construction and has substantially the same thickness as the body portion 12 of the clipboard 10. However, the clipboard 150 is intended for battery operation and accordingly the body portion 152 has a thickness sufficient to receive a pair of spaced apart battery cases 153 and 154 within its interior cavity. Batteries are inserted and retained within the battery cases 153 and 154, by means of removable terminal doors 156 and 157. A fastener of any of the illustrated types can be affixed to the clipboard 150.

An illuminating head 160 which is identical in construction to the previously described illuminating head 14 or 16 is preferably pivotally secured to one end of the body portion 152, by means of a spring loaded hinge 164. A lever assemblage like lever assemblage 22 is also preferably affixed to the illuminating head 160 for operating it, however, a lever assemblage 166 which is like the wheel or disc type illustrated, and described below, can be provided, if desired. Power is supplied to the illuminating head 160, by connecting a terminal clip or the like to the above described conductors and connecting them in appropriate fashion to the batteries and to a rheostat 168.

At the other end of the body portion 152 there is an illuminating head 170 which is affixed to the body portion 152 by a hinge 172 which extends across its width and which is preferably spring loaded. The illuminating head 152 is a hollow shell which can have an exterior shape similar to the illuminating head 160, to provide an attractive appearance to the clipboard 150. It can, however, assume other shapes. A highly polished surface which can be a mirror 174 is affixed to the surface facing the illuminating head 160, and is preferably angularly aligned so that its lower end extends rearwardly. With this arrangement, when an approach plate or the like is positioned within the recessed pocket 176 in the body portion 152 and retained by the illuminating head 170, the surface of the mirror 174 will be positioned in substantially parallel alignment with the vertical plane of the illuminating head 160. More light will be reflected onto the material in the recessed pocket 176 when the mirror 174 is positioned in this manner.

A shaft 178 (FIG. 8) extends through the illuminating head 170 and its ends are rotatably retained within the side walls 179 and 180. A wheel or disc 182 having a knurled peripheral edge is eccentrically secured to one end of the shaft 178 and is positioned to engage the edge of the upper surface of the body portion 152 when it is rotated. A pin 184 also can be affixed to project outwardly from the peripheral surface of the disc 182 so as to be engageable by the operator's thumb or finger to provide additional leverage to rotate the disc 182. As can be best seen in FIG. 10, when the disc 182 is rotated, its peripheral surface engages the surface of the body portion and since it is eccentrically affixed to the shaft, the illuminating head 170 is caused to pivot about the hinge 172.

When using the clipboard 150, the illuminating head 160 is first raised so that an approach plate or the like can be placed and secured beneath it within the recessed pocket 176, by operating the lever assemblage 166. Then the illuminating head 170 is raised so that the other end of the approach plate can be placed and secured beneath it. Illumination is provided by operating the rheostat 168 to provide the desired lighting on the approach plate within the recessed pocket. The light from the illuminating head 160 impinges on and is reflected by the mirror 174 so that the approach plate is well lighted. It can be seen that the material can easily be placed within the recessed pocket 176 and the rheostat 168 operated to provide the desired lighting, using only one hand. The clipboard 150 therefore provides the same desirable features as the clipboard 10 and is ideally suited for use by pilots and the like.

A pair of pockets 185 and 186 for carrying pencils and the like can also be provided on each side of the body portion 152, by forming the shell from which it is constructed, in the manner described below.

In FIGS. 11-15, a clipboard 75 exemplary of still another embodiment of the invention is illustrated. The clipboard 75 has a main body portion 76 which is not recessed so that it provides a writing surface 78, an illuminating head 80 affixed to one end of the body portion 76 and a reflector 81 which also functions as a clip affixed to the opposite end of the body portion.

As can be best seen in FIGS. 11-13, the illuminating head 80 is affixed to the body portion 76 and is adapted to be lifted longitudinally to secure paper, charts and the like beneath it by means of a pair of spaced, spring loaded studs 83 and 84 which are disposed and retained within cavities 89 and 90, respectively, formed in the illuminating head 80. These studs 83 and 84 can be either threadedly secured directly to the body portion, or can be extended through the top wall of the body portion and secured therein by means of threaded nuts 85, as illustrated. The studs 83 and 84 have enlarged head portions 87, and springs 91 are disposed within the cavities 89 and 90 and arranged to engage these head portions 87 and the bottoms of the cavities to bias the illuminating head 80 against the body portion 76. When the illuminating head 80 is raised in order to secure a paper or a chart beneath it, the springs 91 are compressed, and when the illuminating head is released, will forcibly urge the underside of the illuminating head against the paper to secure it upon the writing surface 78, as illustrated in FIG. 13.

The illuminating head 80 as can be best seen in FIG. 11, is substantially rectangular in shape and has an interior reflecting cavity 93 which is closed by a flat lens 94 affixed to the front wall of the illuminating head. The lens 94 is adapted to diffuse light and to reflect it upon the writing surface 78. The back wall of the illuminating head within reflecting cavity 93 is formed to provide two parabolically curved surfaces 95 and 96 on opposite sides of a light bulb 97. The light bulb is retained within a socket 92 removably threaded in the back wall and adapted to extend the light bulb into the reflective cavity 93.

The illuminating head 80 is preferably fabricated in two pieces so that the reflective or parabolic surfaces 95 and 96 can be easily formed, either by molding it in the desired configuration or by machining the parabolic surfaces into a preformed piece of material. The cavities 89 and 90 for the studs 83 and 84 and the aperture (not shown) for the light bulb can be easily preformed or drilled afterwards.

The reflector 81 is pivotally secured to the body portion 76 by means of a hinge 98 which may be spring loaded, or may be biased against the writing surface 78 by means of springs 99 affixed in spaced relation to the reflector 81 and to the body portion 76. The reflector 81 may be substantially U-shaped, with one of its legs 100 affixed to the hinge 98 in a fashion such that its other leg 102 is urged against the writing surface 78. The surface of the leg 102 facing the illuminating head 80 is highly polished or as illustrated, has a mirror 103 affixed to it for deflecting light from the illuminating head 80 back towards it, to assist in illuminating the writing surface 78.

Figure 15:
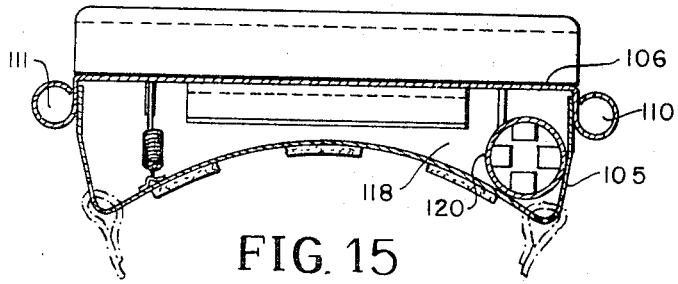
FIG. 15 is a sectional view of the clipboard, taken along lines 15—15 of FIG. 11.

As can be best seen in FIG. 15, the main body portion 76 is constructed of two substantially rectangular shaped shells 105 and 106. The walls of the shell 105 fit within the walls of the shell 106, and the shells are secured together by fastening means such as the threaded screws 108 (FIG. 14). A portion of the side walls of the shell 106 may be reversely bent, as shown in FIG. 15, to form two pockets 110 and 111 for carrying pencils and the like. A spring clip 112 (FIG. 11) may be affixed to each of the pockets at their open ends to removably secure a pencil in them.

The underside of the shell 105 is curved inwardly and a strap 114 (FIG. 14) which may be buckled is affixed to the opposite sides of the clipboard so that the clipboard 75 can be fitted and strapped to a person's leg. A number of resilient strips of material 116, such as rubber, can be affixed to the underside of the clipboard to provide a cushion and to assist in retaining the clipboard in position on the leg.

Figure 18:
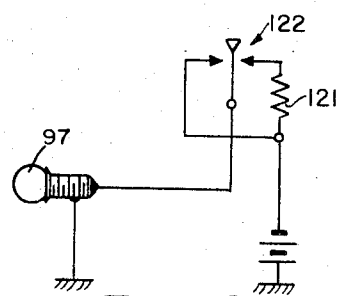
FIG. 18 is a schematic diagram of the electrical circuitry for the clipboard of FIG. 11.

The hollow interior of the shell 105 also provides a cavity 118 for a battery case 120 for holding the batteries (not shown) for energizing the light bulb 97. As can be best seen in FIG. 18 the light bulb 97 may be connected to the batteries directly or through a current limiting means such as the resistor 121, by means of a switch 122. With this arrangement, two degrees of illumination can be provided, which can be selected as desired.

To secure papers, charts and the like to the clipboard 75, the illuminating head 80 is gripped between the fingers and raised vertically to permit the paper to be placed beneath it. The illuminating head is then released and the springs 91 will forcibly urge its underside against the papers to secure them to the clipboard, as illustrated in FIG. 10. The reflector 81 is next pivoted, and the end of the papers clipped beneath it. The switch 122 is operated to provide the desired degree of illumination. The light from the illuminating head is reflected by the mirror 103 affixed to the reflector back upon the material fixed to the clipboard. With this arrangement, only one illuminating head is required, to provide illumination from both ends of the clipboard. Pencils may be conveniently carried in the pockets 110 and 111.

Figure 16:
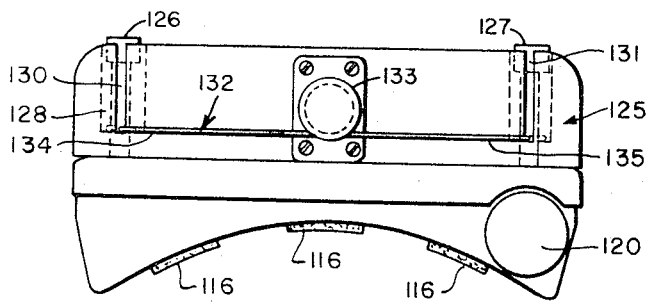
FIGS. 16 and 17 are an end view and a partial top view, respectively, of a clipboard illustrating an alternative method of affixing an illuminating head to a clipboard.
Figure 17:
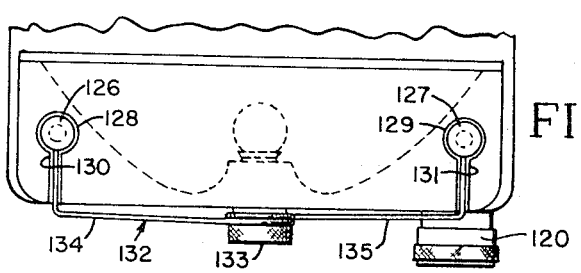

In FIGS. 16 and 17 there is illustrated still another manner in which an illuminating head 125 which may be like the illuminating head 80 can be affixed to a clipboard. In this case, a pair of studs 126 and 127 are extended through cavities 128 and 129, respectively, formed in the illuminating head and are threadedly secured to the body portion of the clipboard. A pair of slots 130 and 131 are formed through the rear of the illuminating head and extend into respective ones of the cavities 128 and 129. A wire spring 132 is wrapped about the end of the light bulb socket 133 and its opposite ends 134 and 135 are extended and angularly bent to extend through respective ones of the slots 130 and 131 and against the bottom of the cavities 128 and 129 to bias the illuminating head 125 against the clipboard. The ends of the spring 132 are also bent to wrap about the studs 126 and 127 to retain the ends within the cavities. The enlarged heads on the studs 126 and 127 function as stops to prevent the illuminating head 125 from being lifted off of the studs. It can be seen that the illuminating head 125 can be used to clip papers, charts and the like to the clipboard, generally in the same manner as described above.

Figure 19:
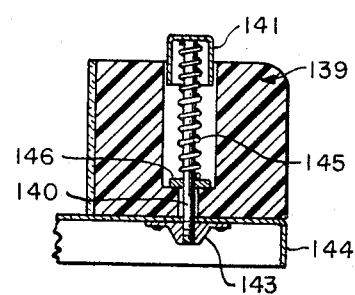
FIG. 19 is a sectional view illustrating still another method of affixing an illuminating head to a clipboard.

In FIG. 19 there is illustrated still another method in which an illuminating head can be affixed to a clipboard. A pair of studs like the stud 140 is affixed, in spaced relation, to the illuminating head 139 and to the clipboard 144, in generally the same fashion as the studs 126 and 127 of FIGS. 16 and 17. The studs 140 each have an inverted cup 141 affixed to its upper end and its lower end is threadedly received in a threaded member 143 secured to the clipboard 144. A spring 145 is retained about the stud 140 and beneath the cup 141 so as to bias the illuminating head 139 against the clipboard 144. A washer-like member 146 is positioned about the stud 140 and under the spring 145 to provide a firm surface for the spring and to prevent damage to the cavity bottom. The illuminating head 139 may be lifted vertically to place papers and the like under it, and the springs 145 will urge the illuminating head against the papers when it is released.

In FIGS. 20 and 21, a leg strap assembly 200 is illustrated which can be affixed to any one of the clipboards described above. The leg strap assembly 200 includes a base plate 202 and a fastening plate 206 which are affixed by means of rivets 203 or the like to the underside of the body portion of a clipboard. A substantially larger leg plate 204 is rotatably affixed to the fastening plate 206 by a tongue and groove arrangement 208 formed by an annular slot in the periphery of the fastening plate 206 and an aperture in the leg plate 204 through which the fastening plate is partly extended. An adjustable leg strap 210 which is adapted to fit around, and to retain the clipboard on a user's leg is affixed to the leg plate 204. The leg plate is preferably fabricated of a strong flexible type material such as plastic so that it will conform, to some degree, to the shape of the leg. The leg plate can be scored, as at 212 and 214, for this purpose. Also, a cushion such as the sponge pad 216 or the like can be affixed to the leg plate 204 for comfort and for assisting in retaining the clipboard in proper position. In use, the clipboard is positioned on the leg and the leg strap 210 wrapped around the leg and fastened by means of a fastener 216. A buckle 218 is provided for adjusting the tension.

Another important feature of the illuminated clipboards of the invention, particularly the embodiments illustrated in FIGS. 1–10, is that the clipboards can be used for emergency cockpit panel lighting in the event the instrument lighting fails. It may be recalled that the underside of the illuminating heads 14, 16 and 160 are open, or sealed with a transparent or light transmitting plate 190, and that they may be opened to and locked in a substantially vertical position, as illustrated in FIG. 6. If the instrument lighting fails, the illuminating heads are pivoted to their open positions and directed to reflect light onto the cockpit panel. It may be noted that in some instances, the clipboard must be reversed in position to effect this result. Experimentation has shown that ample light is provided to illuminate the cockpit panel sufficiently so that the instruments can be observed. The need for additional emergency lighting is therefore eliminated since the clipboards of the present invention can also function in this capacity. In the case of those clipboards which are supplied power by the airplane's electrical system, the source of power to them, for obvious reasons, should be a separate circuit, independent of the instrument lights.

It will thus be seen that the objects set forth above, among those made apparent from the preceding description, efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. For use in illuminating and clamping material to a clipboard, a hinged illuminating head comprising, in combination, a generally rectangular body, said body having an opaque back, top, and end portions, a light transmitting front portion, said front presenting a convex outer surface along its vertical axis and a cylindrical outer surface along its longitudinal axis, a refractive interior behind the light transmitting front including two pairs of parabolically curved surfaces, each pair being formed on the same horizontal axis and extending in opposite directions, a plurality of vertically aligned teeth formed in said parabolically curved surfaces, a light source on the back and in interior opposed relation to the light transmitting front, and a lens barrel portion positioned between each of the parabolically curved surfaces in said pairs interrupting said teeth in direct opposed relationship to the light source, and a hinge at the base of the back to secure the illuminating head to its associated clipboard.

2. A clipboard for retaining and illuminating material such as paper, charts and the like comprising, in combination: a body portion for supporting said material; illuminating means movably fixedly secured to the opposite ends of said body portion, said illuminating means being operable to both releasably clamp material between said illuminating means and said body portion and to illuminate said material, said illuminating means affixed to at least one end of said body portion comprising an illuminating head having a generally rectangular body having opaque back, top, and end portions, a light transmitting front portion, said front presenting a convex outer surface along its vertical axis and a cylindrical outer surface along its longitudinal axis, a refractive interior behind the light transmitting front, a plurality of vertically aligned teeth on said refractive surface, a light source on the back and in interior opposed relation to the light transmitting front, and means interrupting the said teeth in direct opposed relationship to the light source.

3. A clipboard for retaining and illuminating material such as paper, charts and the like comprising, in combination: a body portion for supporting said material; illuminating means movably fixedly secured to the opposite ends of said body portion, said illuminating means being operable to both releasably clamp material between said illuminating means and said body portion and to illuminate said material, said illuminating means comprise a pair of illuminating heads each having a generally rectangular body with an opaque back, top, and end portions, a light transmitting front portion, said front presenting a convex outer surface along its vertical axis and a cylindrical outer surface along its vertical axis and a cylindrical outer surface along its longitudinal axis, a refractive interior behind the light transmitting front, a plurality of vertically aligned teeth on said refractive surface, a light source on the back and in interior opposed relation to the light transmitting front, and means interrupting the said teeth in direct opposed relationship to the light source.

4. A clipboard, as claimed in claim 3, further including a hinge at the base of the back of each of said illuminating heads to secure one of said illuminating heads to the opposite ends of said body portion; and biasing means affixed to each of said illuminating heads for normally biasing them against said body portion to clamp material between said illuminating heads and said body portion.

5. A clipboard for retaining and illuminating material such as paper, charts and the like comprising, in combination: a body portion for supporting said material; illuminating means movably fixedly secured to the opposite ends of said body portion, said illuminating means being operable to both releasably clamp material between said illuminating means and said body portion and to illuminate said material, said illuminating means affixed to at least one end of said body portion comprising an illuminating head having a reflecting cavity, a source of light therein and a lens for diffusing light upon said material; and a lever assemblage affixed to at least one of said illuminating means which is operable with one hand to raise and lower said illuminating means, said lever assemblage including a first lever arm pivotally secured to said body portion, a second lever arm pivotally secured at one end to said illuminating means and at its other end to one end of said first lever arm, stop means affixed to the same end of said first lever arm and an outset handle affixed to the opposite end of said first lever arm.

6. A clipboard for retaining and illuminating material such as paper, charts and the like comprising, in combination: a body portion for supporting said material; illuminating means movably fixedly secured to the opposite ends of said body portion, said illuminating means being operable to both releasably clamp material between said illuminating means and said body portion and to illuminate said material, said illuminating means affixed to at least one end of said body portion comprising an illuminating head having a reflecting cavity, a source of light therein and a lens for diffusing light upon said material; and pivot means affixed to at least one of said illuminating means which is operable with one hand to raise and lower said illuminating means, said pivot means including a rotatable wheel eccentrically mounted on a shaft and positioned to engage said body portion, whereby upon rotating said wheel the eccentric positioning thereof causes said illuminating means to pivot upwardly.

7. A clipboard, as claimed in claim 6, further including a finger engageable shaft projecting outwardly from the peripheral surface of said wheel, for assisting in rotating said wheel.

8. A clipboard for retaining and illuminating material such as paper, charts and the like comprising, in combination: a body portion for supporting said material; illuminating means movably fixedly secured to the opposite ends of said body portion, said illuminating means being operable to both releasably clamp material between said illuminating means and said body portion and to illuminate said material, said illuminating means affixed to at least one end of said body portion comprising an illuminating head having a reflecting cavity, a source of light therein and a lens for diffusing light upon said material; said body portion being formed of a pair of shells affixed to one another to provide a false bottom; variable intensity control means partially concealed within said body portion for providing a continuously variable degree of illumination; a source of power for said illuminating means; and electrical circuit connections between said source of power and said illuminating means generally concealed within said false bottom.

9. A clipboard for retaining and illuminating material such as paper, charts and the like comprising, in combination: a body portion for supporting said material; illuminating means movably fixedly secured to the opposite ends of said body portion, said illuminating means being operable to both releasably clamp material between said illuminating means and said body portion and to illuminate said material, said illuminating means comprise an illuminating head at one end of said body portion and a clamp at the opposite end thereof, said illuminating head having a pair of spaced cavities formed therein, a stud having an enlarged head portion extended through each of said cavities and secured to said body portion; biasing means within each of said cavities retained between said enlarged head portions of said studs and the bottoms of said cavities for normally biasing said illuminating head against said body portion, and a light source within said illuminating head; said clamp being normally biased against said body portion and having a reflecting surface in facing relationship with said illuminating head.

10. A clipboard for retaining and illuminating material such as paper, charts and the like comprising, in combination: a body portion for supporting said material; illuminating means movably fixedly secured to the opposite ends of said body portion, said illuminating means being operable to both releasably clamp material between said illuminating means and said body portion and to illuminate said material, said illuminating means comprise an illuminating head at one end of said body portion and a clamp at the opposite end thereof, said illuminating head having a generally rectangular body with an opaque back, top, and end portions, a light transmitting front portion, a light source on the back and in interior opposed relation to the light transmitting front, and a pair of oppositely disposed parabolically curved surfaces on opposite sides of said light source for directing light therefrom through said light transmitting front, a pair of spaced cavities formed in said body, a stud having an enlarged head portion extending through each of said cavities and secured to said body portion; biasing means within each of said cavities retained between said enlarged head portions of said studs and the bottoms of said cavities for normally biasing said illuminating head against said body portion; said clamp being normally biased against said body portion and having a reflecting surface in facing relationship with said illuminating head.

11. A clipboard for retaining and illuminating material such as paper, charts and the like comprising, in combination: a body portion for supporting said material, illuminating means movably fixedly secured to the opposite ends of said body portion, said illuminating means being operable to both releasably clamp material between said illuminating means and said body portion and to illuminate said material, said illuminating means affixed to at least one end of said body portion comprising an illuminating head having a reflecting cavity, a source of light therein and a lens for diffusing light upon said material, said body portion being formed of a pair of shells adapted to fit within one another, one of said shells having opposed side walls having portions thereof reversely folded to form hollow cylindrical cavities along the sides of said clipboard.

12. A clipboard for retaining and illuminating material such as paper, charts and the like comprising, in combination: a body portion for supporting said material; illuminating means movably fixedly secured to the opposite ends of said body portion, said illuminating means being operable to both releasably clamp material between said illuminating means and said body portion and to illuminate said material, said illuminating means affixed to at least one end of said body portion comprising an illuminating head having a generally rectangular body with an opaque back, top, and end portions, a light transmitting front, socket means and a light source removably secured therein affixed to said back in a fashion such as to reflect light from said light source onto said light transmitting front, and a pair of oppositely disposed parabolically curved surfaces on opposite sides of said light source for directing said light from said light source through said light transmitting front, a pair of spaced apart cavities formed in said body extending vertically from said top substantially completely through said body, a pair of slots in said back intersecting respective ones of said cavities, a pair of studs for movably affixing said illuminating means to said body portion, said studs each having an enlarged head portion and being disposed within respective ones of said cavities and secured to said body portion with said enlarged head portions thereof positioned at the open top of said cavities; a spring secured to said socket means and having ends formed to extend through respective ones of said slots into said cavities and to resiliently bear against the bottoms of said cavities to normally bias said illuminating means against said body portion.

13. A clipboard for retaining and illuminating material such as paper, charts and the like comprising, in combination: a body portion for supporting said material; illuminating means movably fixedly secured to the opposite ends of said body portion, said illuminating means being operable to both releasably clamp material between said illuminating means and said body portion and to illuminate said material, said illuminating means affixed to at least one end of said body portion comprising an illuminating head having a generally rectangular body having opaque back, top and end portions, and a light transmitting front portion, the underside of said body being open to emit light, said illuminating head being affixed to said body portion and adapted to be opened and locked in a substantially vertical position so that light can be emitted from the open underside thereof, whereby said clipboard can function as emergency cockpit panel lighting for an aircraft and the like; the underside of said illuminating head further being effectively closed with a plate of light transmitting material.

14. A clipboard for retaining and illuminating material such as paper, charts and the like comprising, in combination: a body portion for supporting said material; illuminating means movably fixedly secured to the opposite ends of said body portion, said illuminating means being operable to both releasably clamp material between said illuminating means and said body portion and to illuminate said material, said illuminating means affixed to at least one end of said body portion comprising an illuminating head having a reflecting cavity, a source of light therein and a lens for diffusing light from said source upon said material and said illuminating head following and further being operable to and lockable in a raised emergency lighting position to reflect light onto the instrument panel of an aircraft to provide emergency cockpit panel lighting.

References Cited

UNITED STATES PATENTS

| 1,320,537 | 11/1919 | Dimond | 240—6.4 |
| 1,899,499 | 10/1931 | Ferree et al. | 240—6.4 |
| 2,029,425 | 11/1933 | Kaylor et al. | 240—6.4 |
| 2,140,090 | 5/1937 | Oppenheimer | 240—6.4 |
| 3,046,389 | 7/1962 | Catelli et al. | 240—6.4 |
| 3,215,453 | 11/1965 | Malcom | 240—6.4 |
| 3,235,720 | 2/1966 | Bridge | 240—41.3 |

NORTON ANSHER, *Primary Examiner.*

C. B. FUNK, *Assistant Examiner.*